US008665329B2

(12) United States Patent
Arcaini et al.

(10) Patent No.: US 8,665,329 B2
(45) Date of Patent: Mar. 4, 2014

(54) APPARATUS FOR AUTOMATICALLY IGNORING CAST SELF SHADOWS TO INCREASE THE EFFECTIVENESS OF VIDEO ANALYTICS BASED SURVEILLANCE SYSTEMS

(76) Inventors: Gianni Arcaini, Jacksonville, FL (US); Prem Kuchi, Jacksonville, FL (US); Avinash Nehemiah, Jacksonville, FL (US)

(*) Notice: Subject to any disclaimer, the term of this patent is extended or adjusted under 35 U.S.C. 154(b) by 866 days.

(21) Appl. No.: 12/813,846

(22) Filed: Jun. 11, 2010

(65) Prior Publication Data
US 2011/0304729 A1 Dec. 15, 2011

(51) Int. Cl.
*H04N 7/18* (2006.01)
*G06K 9/34* (2006.01)

(52) U.S. Cl.
USPC .......................................... 348/143; 382/171

(58) Field of Classification Search
USPC .......................................... 348/143; 382/171
See application file for complete search history.

(56) References Cited

U.S. PATENT DOCUMENTS

| 5,495,536 | A | | 2/1996 | Osbourn | |
|---|---|---|---|---|---|
| 5,532,828 | A | | 7/1996 | Mitsuse | |
| 5,687,253 | A | * | 11/1997 | Huttenlocher et al. | 382/177 |
| 6,118,886 | A | | 9/2000 | Baumgart et al. | |
| 6,489,989 | B1 | * | 12/2002 | Shapiro et al. | 348/180 |
| 6,803,920 | B2 | * | 10/2004 | Gossett et al. | 345/591 |
| 6,956,961 | B2 | * | 10/2005 | Cong et al. | 382/133 |
| 7,873,219 | B2 | * | 1/2011 | Friedhoff | 382/199 |
| 2006/0170769 | A1 | * | 8/2006 | Zhou | 348/143 |
| 2008/0150946 | A1 | * | 6/2008 | Kuo | 345/442 |
| 2011/0001824 | A1 | * | 1/2011 | Chang | 348/143 |

FOREIGN PATENT DOCUMENTS

| EP | 1605406 A2 | * | 12/2005 |
|---|---|---|---|
| GB | 2439184 A | * | 12/2007 |
| JP | 2008005365 A | * | 1/2008 |
| WO | WO 2007136332 A1 | * | 11/2007 |

* cited by examiner

*Primary Examiner* — Kostas Katsikis
(74) *Attorney, Agent, or Firm* — Lawrence J. Gibney, Jr.

(57) ABSTRACT

One of the challenges in video surveillance system is the detection of unwanted intruders in secure zones. These zones may be in large facilities such as airports, train stations, port facilities or warehouses. Because many of these locations are outdoors, the presence of shadows is detected on images. In order to effectively eliminate these shadows which will therefore result in a usable figure, these shadows must be eliminated. This is accomplished by forming a contour box around the image and then reducing the shadows based on preset parameters in the software.

7 Claims, 2 Drawing Sheets

APPARATUS FOR AUTOMATICALLY IGNORING CAST SELF SHADOWS TO INCREASE THE EFFECTIVENESS OF VIDEO ANALYTICS BASED SURVEILLANCE SYSTEMS

BACKGROUND OF THE INVENTION

A. Field of the Invention

This relates to video systems in general and the ability to illuminate shadows to increase the effectiveness of video-based intelligence surveillance systems. The purpose of the video-based intelligence surveillance system is to track and detect moving objects in a defined field of view. Oftentimes shadows will skew the results and give false images. The purpose of this device is to eliminate those self shadows, which is defined as a shadow generated by an object of interest whether the object of interest is a human being or an inanimate object such as a car or a train, for example.

B. Prior Art

There are other prior art references to intelligent video systems and the detection of a variety of different apparatus and methods. A representative example can be found at Baumgart, U.S. Pat. No. 6,118,886. Baumgart is an automatic target recognition apparatus, having a video camera for producing a digitized image signal and representing an image containing objects wherein the objects are to be recognized if they meet predefined criteria. The digitized image signal is processed within a video analysis, using appropriate software.

Another image processing center and method for recognizing and removing shadows from the image of a monitored scene is included in Osbourn, U.S. Pat. No. 5,495,536. This clearly defines the object, which is being studied.

Another example in the prior art is Mitsuse, U.S. Pat. No. 5,532,828, which is an image-forming apparatus.

BRIEF SUMMARY OF THE INVENTION

In order to effectively produce valuable surveillance, the surveillance system must be able to clearly distinguish between objects and shadows. The objects are not necessarily limited to humans but may be inanimate objects such as cars, trucks, and rail cars. When a shadow is presented, however, this tends to alter the results from the video surveillance system and possible rendering any information useless.

Because the surveillance system operates in areas that cover large areas of land it is generally viewed by the operator or user at a remote location. Because the system is designed to provide information at a remote location, it is important that the information be as accurate as possible.

Surveillance systems operate in large areas and oftentimes these areas are in natural light and at times in areas with compromised lighting conditions. Examples of the areas where the system may operate include rail yards, port terminals or warehouses. Because natural light is involved shadows are likely to be produced.

The purpose of any surveillance system, generally speaking, is to detect objects in a given area and usually an unauthorized object or intruder in a particular area. Humans tend to have very distinct physical features and physical motions.

These human characteristics are typically defined by motion history, motion saliency, typical size, and aspect ratio. Humans tend to move in certain predetermined patterns and these are included in the motion history and motion saliency. Humans also tend to have certain physical features and these features are generally in certain defined proportions and this is what is generally meant by aspect ratio.

If the system is to detect the presence of a human person, the system should be able to clearly define the parameters of the human person. The presence of a shadow will disrupt these particular images, making detection and surveillance literally impossible because ambient light changes from day to day and even from hour to hour. The system needs to be able to clearly detect the presence of a human in the clearest possible terms.

Some shadows change both the width and height of a potential intruder depending on particular lighting conditions in the area. Shadows can distort both the height and width of a particular shape thus making any surveillance system useless in terms of detecting a human person in any given area.

In this system the shape is captured by the software that is installed with this system and a boundary box is placed around a particular image. This boundary box is capable of tracking the image within the box.

With this system that is based in part on the use of vectors, some of the area of the boundary box is edited based on the aspect ratio of the human form. In this fashion the box is resized to an appropriate height of the box.

Once the appropriate height is determined, the boundary box is again edited to correct for an appropriate width. This is accomplished through use of an angle that is approximated by using the length of a shadow to reconfigure the box.

With these adjustments the boundary box is now calibrated or resized to capture the human form so that the system works to obtain the most accurate information with the least amount of error.

If the system detects an intruder, an alarm may be sent to a remote area. The system is also able to track the image within the facility.

NUMBERING AND LETTERING REFERENCES

Figure 1:
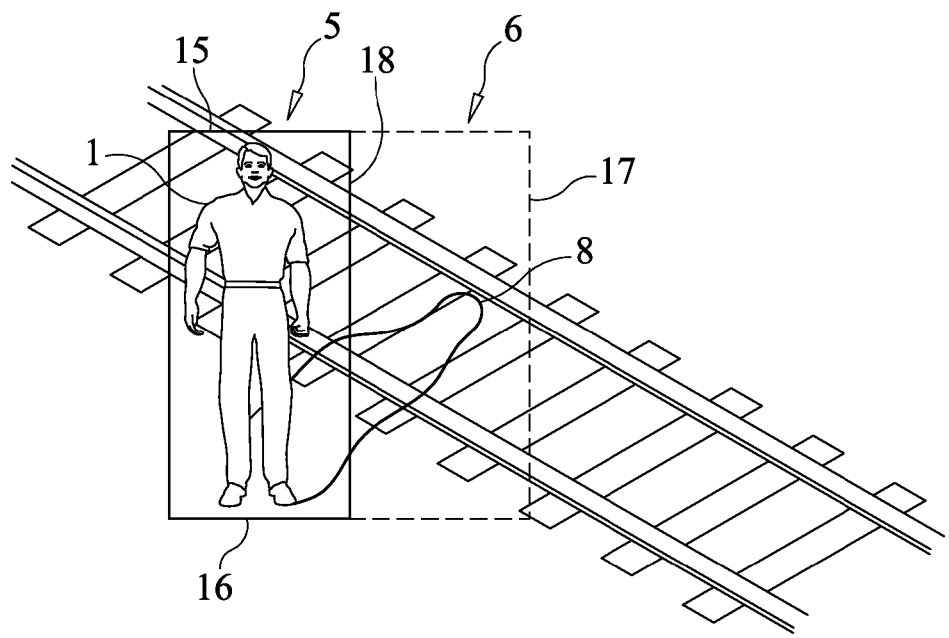
FIG. 1 is a depiction of a human person near a train track with a shadow and a train track.

1 Human form
5 Edited Boundary Box
6 Boundary Box
8 Shadow
10 Captured image
12 Vectors
15 Top Line of Boundary Box
16 Bottom Line of Boundary Box
17 Vertical Line of Boundary Box
18 Vertical Line of Edited Boundary Box
20 Vertical Line
25 Angle
35 Horizontal Line
40 Peak of image
A Distance between top most point of contact and point of reference
B Distance between top most point of contact and point of reference
C Distance between top most point of contact and point of reference D Distance between top most point of contact and point of reference

DETAILED DESCRIPTION OF THE EMBODIMENTS

With any surveillance system shadows can distort images so that the system does not properly detect the presence of human intruders. The effectiveness of any video-based intelligence surveillance system is measured by its ability to detect the presence of unwanted intruders and send appropriate alarms.

This method and apparatus uses several different features to detect intruders in a secure zone by eliminating the presence of shadows. The end result is to have increased true detection rates and a decreased false alarm rate for the surveillance system.

One of the central hardware components of this system is the video capture equipment (not depicted), probably cameras that should operate in low levels of light and also include infrared capability. Software is incorporated into the system and will process the information so that the presence of a human intruder can be detected. The software will distinguish between the presence of a car, train car or other inanimate object and a human person. The software will capture the images and then forward to a remote location for appropriate remedial action.

The presence of soft shadows, which are shadows created by the object itself, present one of the more challenging issues to computer vision solutions, specifically in the case of intelligent video surveillance where one of the goals is to detect any unauthorized intruders and soft shadows mask some of the best detectible features, typically of the human form. Some of these best detectible features include height and aspect ratio i.e. the relationship of the human height to human width.

In order to be able to detect intruders with acceptable sensitivity, most video surveillance systems decrease the detecting thresholds. However, a byproduct of decreasing the detecting threshold is that the false alarm rate is increased. The invention in this document eliminates the effective soft shadows, resulting in a better true detection rate without an increased false alarm rate.

One of the prime objectives of any video surveillance system is to detect unauthorized intruders. Humans or intruders, by their very nature, have several defining features, which include motion history, motion saliency, typical size, and aspect ratio.

This system captures images and places them in a boundary box 6. The boundary box will be framed so the image will be placed in a rectangular box with defined sides. Software that is incorporated into the system will then adjust the height and width of the image within the boundary box to eliminate any self cast shadows to determine if the form of a human has been captured. If a human form has been detected, the system will permit the image to be tracked in the facility and will also allow an alarm to be sent to a remote location, if desired.

Figure 2:
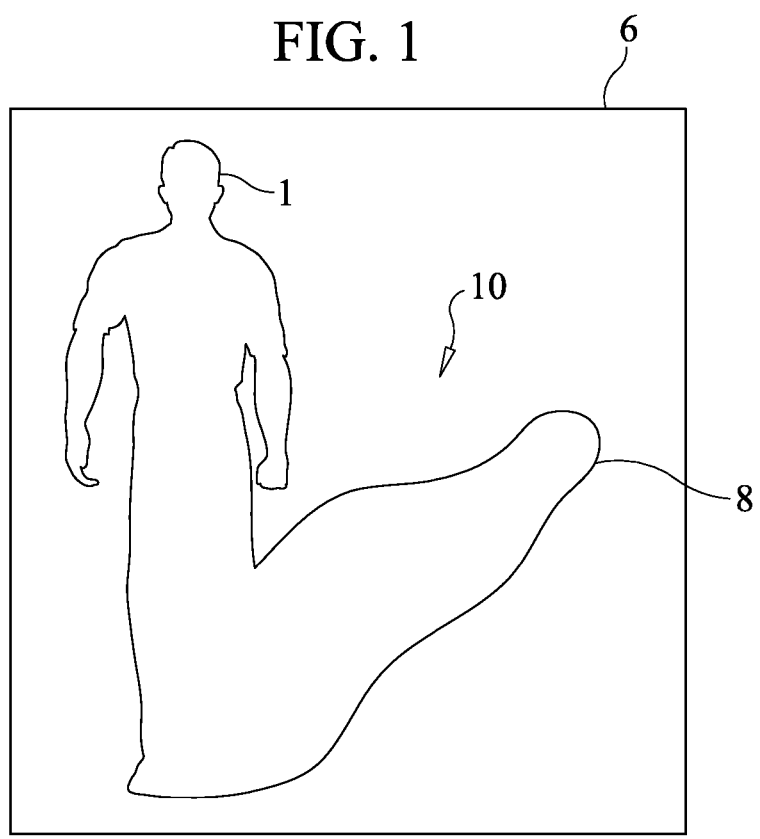
FIG. 2 is a silhouette of a human person with a shadow with the environment eliminated.

A soft shadow 8 will change the image of the dimensions that is captured within a typical boundary box 6 such as depicted in FIGS. 1 and 2. The presence of a soft shadow and the resultant dimension changes would render the surveillance useless by altering the size and aspect ratio features to a point of insignificance.

FIG. 1 depicts the initially captured image that is framed in the boundary box 6 and also depicts the new image of the human that is created by the software and framed in the edited boundary box 5. The edited boundary box 5 is the altered box whereas the boundary box 6 is the image of the human person that also includes the shadow. When the image is initially captured the image is placed in a rectangular boundary box 6 which has a defined top line 15, a defined bottom line 16 and defined vertical line 17. When the system operates to eliminate the shadow the system places a vertical line for the edited boundary box 18 to replace the initial vertical line 17.

In FIG. 1, the soft shadows 8, which are included in the boundary box 6, will change both the width and the height of the potential intruder candidate 1. This boundary box 6 must be adjusted in two distinct steps to render the system effective and result in the creation of the edited boundary box 5 such as depicted in FIG. 1.

Once the image with the shadow is captured, the first step is to trim the width of the boundary box 6 using drop histograms 30.

The first step is to capture the contour of the potential intruder candidate 1 as depicted in FIGS. 1 and 2 and then adjust the width of the boundary box 6 in order to produce usable information.

The algorithm of the width adjustment is described in the following steps. The first step is to start with the contour of the image 10 that includes both the image of the human 1 as well as the shadow 8 such as depicted in FIG. 2. Boundaries of FIG. 2 are created by the software.

Figure 3:
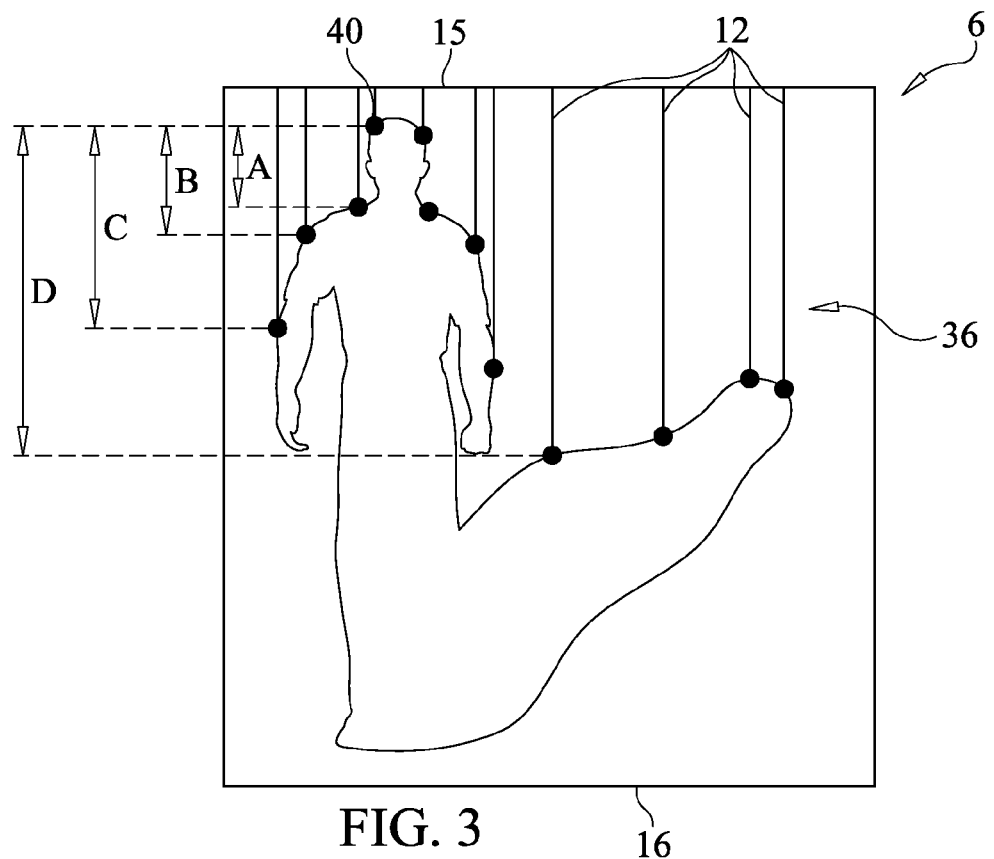
FIG. 3 is a view of the silhouette with a series of vector lines from the top of a mounting or boundary box.

Several points along the top line 15 of the boundary box are then intersected with the first point on the contour or image in the vertical direction such as depicted in FIG. 3.

A series of vectors 12 are then formed and these vectors are collectively called the drop histogram 30.

A series of vectors with lengths of these lines are called the drop histogram 30. The software that is included will detect a steep drop in the consecutive pixels compared to the peak 40 in the histogram, which would indicate the beginning of a shadow. For instance, in FIG. 3, the distance depicted in A, B, and C indicates the presence of a human intruder based on preset values for the human form that will determine the typical height of the human, whereas the distance measured by Line D would detect the beginning of a shadow because of the steep drop in consecutive pixels. The pixels that are a part of the shadow are then removed, and the width is recalculated and becomes the adjusted width to reconfigure the edited boundary box 5 with a new edited vertical line 18.

Once the width has been reconfigured, the height of the bounding box must then be recalculated.

Figure 4:
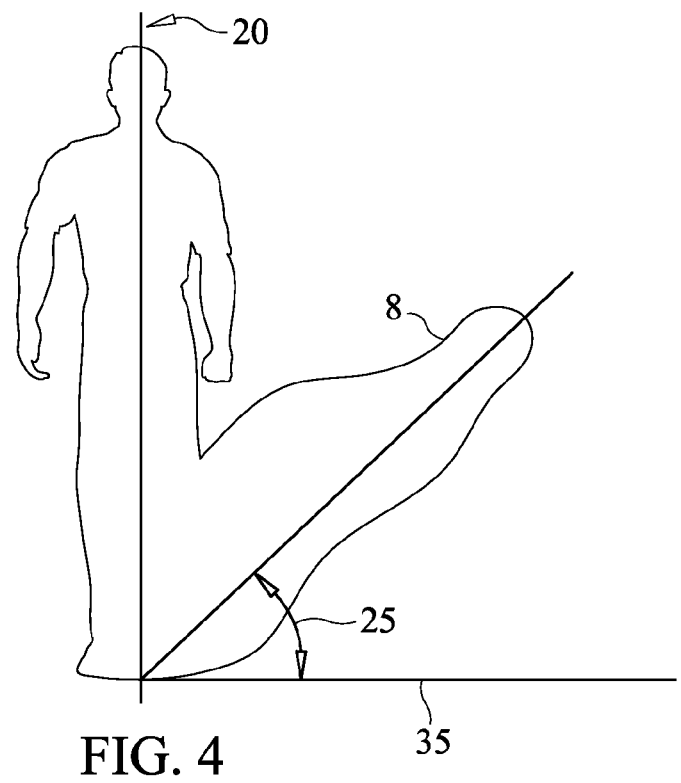
FIG. 4 is a silhouette, depicting the angle of the shadow.

The height then, however, must be adjusted, and this is depicted in FIG. 4. Based on the estimated shadow width from the width adjustment procedure, such as depicted in foregoing steps and demonstrated by FIG. 3, the angle of the shadow is now calculated.

The angle of the shadow is calculated as the average gradient angle based on the edge map of a point estimated to be in the shadow. A vertical line 20 is placed in the center of the new width, such as depicted in FIG. 4. This vertical line should be in the approximate center of the human form that is detected by the software.

An angle is then created by the software by producing a horizontal line 35 that will intersect at the bottom of the image and the vertical line 20. Another line is produced that will intersect the approximate center of the shadow 8 and form the appropriate angle 25. The intersection of lines 20 and 35 produce the bottom line of the edited boundary box. The top line of the edited boundary box 15 is the same as the boundary box top line.

Once it has been determined that a human intruder has been detected the software is capable of tracking the image in the facility. Depending of preset configurations, the software will also produce an alarm based on the presets to alert individuals of the presence of an intruder. The alarm may be audible throughout the facility or audible only at the remote location. The system is capable of sending the video images as well as the alarm to a remote location for appropriate action.

Due to its reconfiguration of the initially captured image the software surveillance system that is described is a more intelligent analysis of possible human intruders.

While the embodiments of the invention have been disclosed, certain modifications may be made by those skilled in the art to modify the invention without departing from the spirit of the invention.

The inventors claim:

1. An apparatus that performs method steps for automatically ignoring cast self shadows to increase the effectiveness of video-based surveillance systems comprised of:
   a. video capture equipment;
      wherein the video capture equipment captures images of an object;
   b. a memory comprising software;
      wherein the software processes the captured video image;
      wherein the software creates a boundary box around the captured image;
      wherein the software adjusts the height and the width of the image within the boundary box;
      said software adjustment of height and width eliminates soft shadows;
      said boundary box is rectangular;
      said boundary box has a certain defined shape;
      wherein an initial vertical line is placed in the boundary box;
      wherein the software edits the boundary box to produce an edited boundary box;
      said software produces a drop histogram;
      said drop histogram is comprised of a series of vectors;
      said vectors extend from the top line of the boundary box to predetermined points on the captured image;
      wherein the software reconfigures the image within the boundary box based on the drop histogram;
      wherein the software reconfigures the width of the boundary box based on the drop histogram;
      wherein the software creates a vertical line through the approximate center of a desired image in the edited boundary box;
      wherein the software creates a line through the approximate center of a shadow;
      wherein a line is placed on the bottom line of the boundary box to create an edited boundary box;
      wherein said bottom line, said vertical line through the desired image, and said line through shadow meet at one common vertex;
      wherein the software determines an angle between said lines;
      said angle determines the angle of the shadow;
      said software eliminates the shadow.

2. The apparatus as described in claim 1 wherein the video capture equipment operates in dim lighting conditions.

3. The apparatus as described in claim 1 wherein the video capture equipment has infrared capability.

4. The apparatus as described in claim 1 wherein the drop histogram is further comprised of:
   a series of vectors that extend from the top line of the boundary box to predetermined points on the captured image;
   said first point is the top most point on the captured image;
   wherein the software detects the amount of distance between points from the top most point on the captured image and other predetermined points on the captured image.

5. The apparatus as described in claim 1 wherein the adjustment of the height and width of the object within the boundary box is performed in two distinct steps:
   wherein the first step is comprised of adjusting the width of the boundary box;
   wherein the second step is comprised of adjusting the height of the boundary box.

6. The apparatus as described in claim 1 wherein the alarm is sent to a remote location.

7. The apparatus as described in claim 1 wherein the image is transmitted to a remote location.

* * * * *